United States Patent
Buse et al.

(10) Patent No.: US 6,810,420 B1
(45) Date of Patent: Oct. 26, 2004

(54) ALLOCATION OF IP ADDRESS BY PROXY TO DEVICE IN A LOCAL AREA NETWORK

(75) Inventors: Christopher J Buse, Watford (GB); Andrew P White, St Albans (GB); David Kirby, Hemel Hempstead (GB); Robert Allsworth, Abingdon (GB); David E Bill, St Albans (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/494,401

(22) Filed: Jan. 31, 2000

(30) Foreign Application Priority Data

Nov. 3, 1999 (GB) .............................................. 9925897

(51) Int. Cl.[7] .............................................. G06F 15/173
(52) U.S. Cl. ...................................... 709/224; 709/220
(58) Field of Search ................................ 709/222–224, 709/220

(56) References Cited

U.S. PATENT DOCUMENTS

| | | | |
|---|---|---|---|
| 4,680,583 A | 7/1987 | Grover | |
| 4,773,005 A | 9/1988 | Sullivan | |
| 5,029,209 A | 7/1991 | Strong, Jr. et al. | |
| 5,894,479 A * | 4/1999 | Mohammed | 370/401 |
| 5,978,373 A * | 11/1999 | Hoff et al. | 370/392 |
| 5,991,806 A * | 11/1999 | McHann, Jr. | 709/224 |
| 5,996,010 A * | 11/1999 | Leong et al. | 709/223 |
| 6,003,077 A * | 12/1999 | Bawden et al. | 709/223 |
| 6,006,019 A * | 12/1999 | Takei | 709/224 |
| 6,052,727 A * | 4/2000 | Kamalanathan | 709/224 |
| 6,070,187 A * | 5/2000 | Subramaniam et al. | 709/220 |
| 6,101,499 A * | 8/2000 | Ford et al. | 707/10 |
| 6,101,528 A * | 8/2000 | Butt | 709/203 |
| 6,157,956 A * | 12/2000 | Jensen et al. | 709/246 |
| 6,236,983 B1 * | 5/2001 | Hofmann et al. | 706/47 |
| 6,282,575 B1 * | 8/2001 | Lin et al. | 709/244 |
| 6,300,863 B1 * | 10/2001 | Cotichini et al. | 340/5.8 |
| 6,360,260 B1 * | 3/2002 | Compliment et al. | 709/224 |
| 6,490,617 B1 * | 12/2002 | Hemphill et al. | 709/223 |
| 6,496,859 B2 * | 12/2002 | Roy et al. | 709/223 |

OTHER PUBLICATIONS

Comer, "Internetworking with TCP/IP", vol. 1, 3rd Edition, 1995, pp. (368–369 and cover page) (4).*

* cited by examiner

*Primary Examiner*—Bunjob Jaroenchonwanit
(74) *Attorney, Agent, or Firm*—Nixon & Vanderhye PC

(57) ABSTRACT

A device is discovered on a network by means of a discovery protocol operated by a proxy and a protocol address for the device is obtained if required by the proxy, which requests a protocol address in accordance with a dynamic host communication protocol, then in the absence of response to that request attempts automatic private addressing and finally if necessary allows manual entry of a protocol address for the device.

1 Claim, 3 Drawing Sheets

| 0 | 8 | 16 | 24 | 32 |
|---|---|---|---|---|
| Opcode (16) MSB | LSB | Sequence no. (16) MSB | LSB | |
| MAC addr (48) MSB | | | | |
| | LSB | Result (16) MSB | LSB | |
| IP address (32) MSB | | | LSB | |
| Subnet mask (32) MSB | | | LSB | |
| Default Gateway (32) MSB | | | LSB | |
| Lease (32) MSB | | | LSB | |
| Name | Length = 48 bytes | | | |

FIG.4

| Field | Size(bytes) | Description |
|---|---|---|
| Op-code | 2 | 1 = I_AM_HERE (sent by device, includes current units paramters)<br>2 = YOU_ARE (sent by proxy, includes parameters to use)<br>3 = ARE_YOU_THERE (sent by proxy, parameters ignored) |
| Sequence Number | 2 | Sequence Number. Will be set to a new value for each request, used to match requests with responses. |
| Mac Address | 6 | Unit hardware address or broadcast address for an initial ARE_YOU request frame |
| Result | 2 | 0 = No error |
| IP Address | 4 | Unit configured IP address (0.0.0.0 if unconfigured) |
| Subnet Mask | 4 | Unit configured Subnet mask (0.0.0.0 if unconfigured) |
| Gateway | 4 | Unit configured default gateway (0.0.0.0 if unconfigured) |
| Lease | 4 | The length of time in seconds for device to use these IP address parameters. This is used by proxy to indiciate that the address is obtained via DHCP and has a finite lease time. 0xFFFFFFFF represents a non-expiring address. |
| Name | 48 | ASCII string with the description of the unit (e.g. 3Com OfficeConnect Dual Speed Switch 16). Padded with 0's, unless maximum length. |

FIG.5

ALLOCATION OF IP ADDRESS BY PROXY TO DEVICE IN A LOCAL AREA NETWORK

FIELD OF THE INVENTION

This invention relates to packet-based data communication networks, particularly local area networks (LANs) and more particularly to the allocation of a protocol (IP) address to a device newly connected into the network

BACKGROUND OF THE INVENTION

When a new device is connected into an existing network, typically a local area network, it is desirable to determine whether such a device has a protocol address which is compatible with other devices on the network and to allocate the protocol address to the device if it does not already possess one. Another aspect of the process is the discovery of a device which does not have a protocol address on a network and to configure its protocol address in a convenient and compatible manner.

There are various schemes, such as dynamic host communication protocol (DHCP), and automatic private IP addressing, which can be used by a device to obtain a protocol address which is compatible with the network in which the device is to operate.

Ordinary network management discovery mechanisms generally rely on an existing configuration of devices for IP (internet protocol) and discover devices by performing a process known as ICMP Echo Request and Reply for all the IP addresses in a management station subnet. They presume that the user or network manager is knowledgeable.

Many devices have limited memory available for embedded software and are therefore not well adapted for direct participation in the programmed allocation of EP addresses.

SUMMARY OF THE INVENTION

One aspect of the present invention is a discovery scheme which can be operated by a proxy device such as a personal computer coupled to a local area network, and which facilitates the discovery of devices which may or may not be configured with an IP address.

Another aspect of the invention is a proxy scheme for the allocation of an IP address to a new unconfigured device discovered by the discovery mechanism.

Further objects and features will be apparent from the following description by way of example of a preferred scheme according to the invention

BRIEF DESCRIPTION OF THE DRAWINGS

FIG. 4 is a table showing the organisation and sizes of fields within control packets which may be employed in the present invention.

FIG. 5 is a table indicating the names and purposes of the fields within the control packets.

DETAILED DESCRIPTION OF EXEMPLARY EMBODIMENTS

Figure 1:
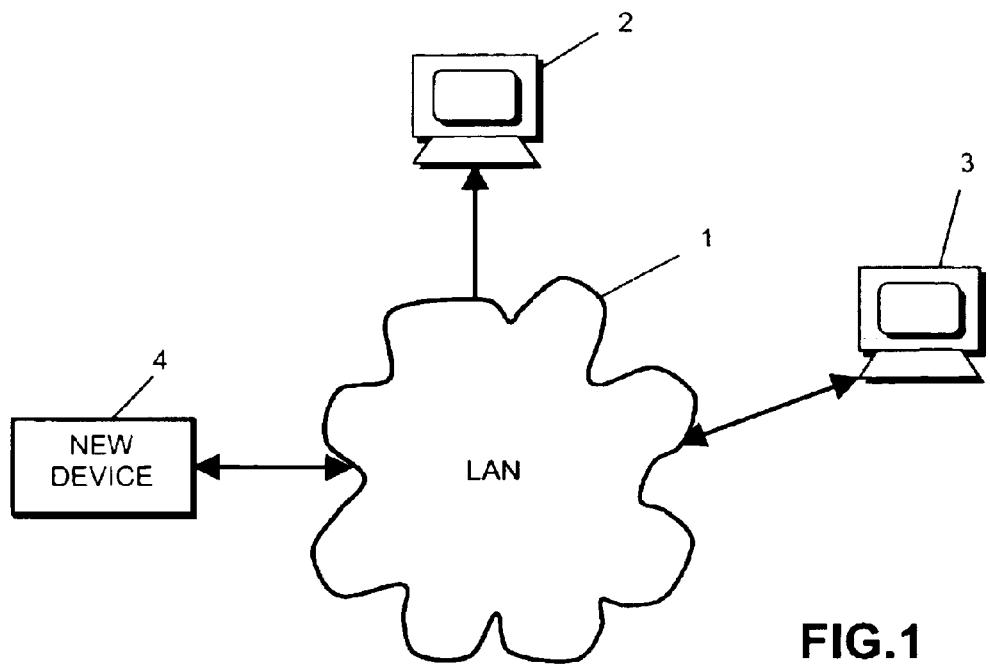
FIG. 1 illustrates in simplified form a local area network and some devices connected thereto.

FIG. 1 illustrates a local area network 1, comprising a multiplicity of interconnected devices. Coupled to the network is a user terminal 2 which may, particularly if it is operating under a 'Windows' (registered trade mark) operating scheme, host a DHCP (dynamic host communication protocol) and also an automatic private IP addressing scheme Reference numeral 3 denotes a PC coupled to the local area network and capable of operating the schemes described hereinafter.

Various allocation schemes may be used in networks of this general character. They are known as DHCP, automatic private IP addressing and the manual allocation of static addresses.

PCs that are configured to acquire an address by DHCP but fail to locate a DHCP server may be able to allocate themselves an address at pseudo random from a particular subnet. If the PC supports DHCP but not the self allocation feature it will attempt to operate with no IP address if DHCP fails to allocate an address. In this instance the PC will operate as a local machine but not participate in the network. If the PC can allocate its IP address it then performs an address resolution protocol on the address to check for any conflict and proceeds to use the allocated address.

Figure 2:
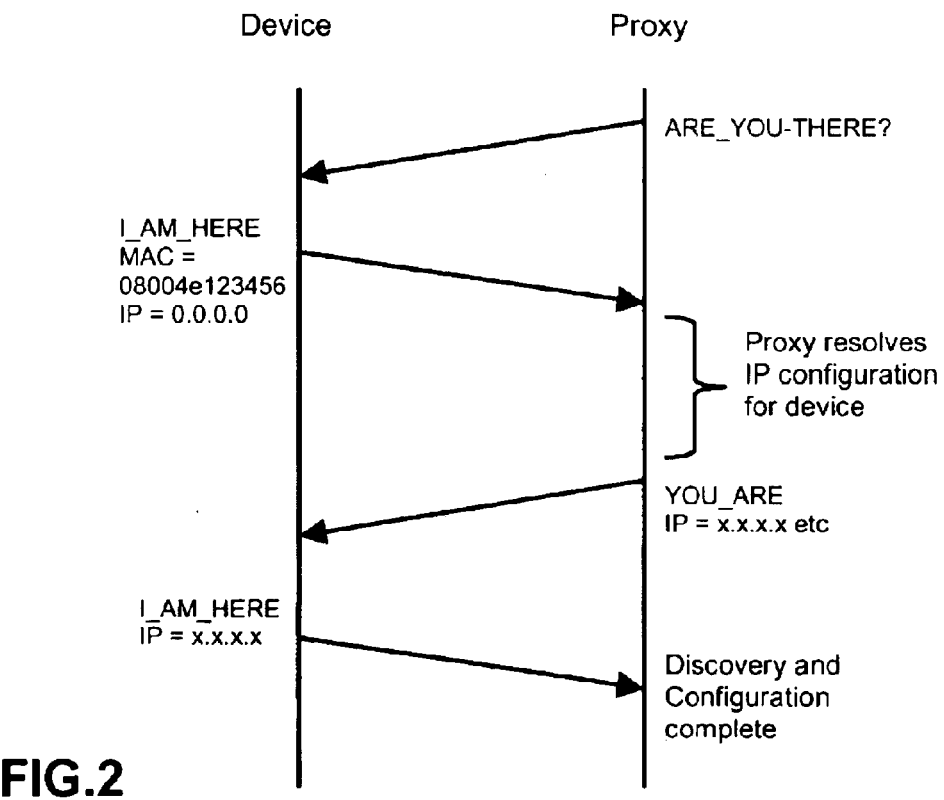
FIG. 2 schematically illustrates a discovery protocol.
Figure 3:
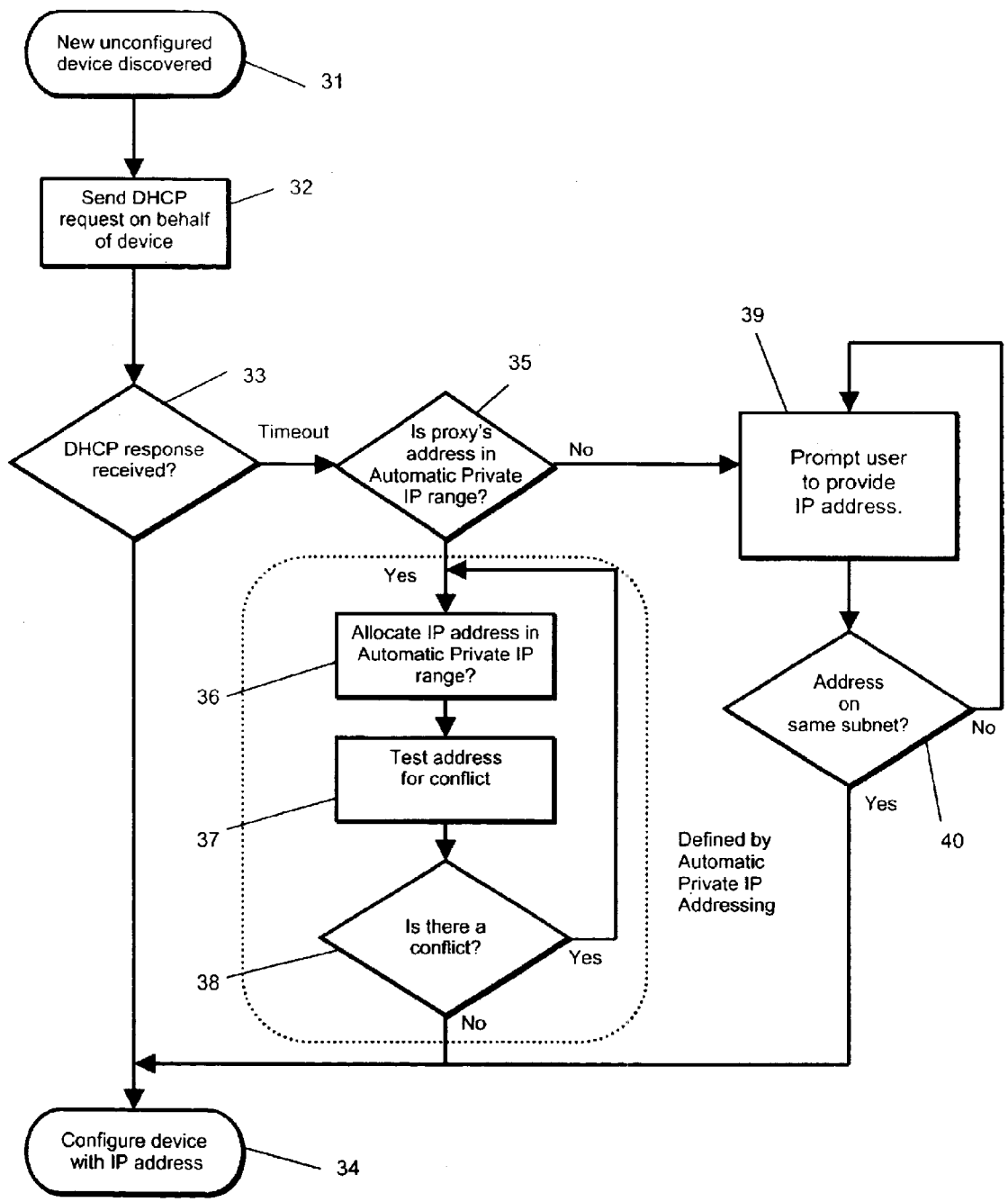
FIG. 3 illustrates the operation of an IP address allocation scheme which may be performed by a proxy in a system according to FIG. 1.

FIG. 2 illustrates the discovery protocol which may be performed by the proxy in relation to a new device. FIG. 3 and 4 illustrate by way of example the control frames or packets that can be employed. The process employs three basic packets, distinguished by different operating codes ('Op-codes'). The proxy will periodically send an interrogation, identified herein as a frame having the 'ARE_YOU_THERE!' op-code Devices that see such an interrogation will respond with a reply, identified herein as a control frame having the 'I_AM_HERE' op-code. The device will return its MAC address (the third, 6-byte, field shown in FIGS. 4 and 5. Unconfigured devices will respond with an IP address field set to a convenially invalid value such as 0.0.0.0. Devices such as servers that have previously been configured will respond with an IP address field set to their IP address, completing the exchange. If desired or appropriate the device may return in the appropriate fields values for a subnet mask (set to an invalid value if the device is unconfigured), a default gateway (likewise set to an invalid value if the device is unconfigured) and a lease time which can be used by a proxy to indicate that the address is obtained by DHCP and is time-limited. A particular conventional value is employed to represent an infinite lease time.

A response from a device with an unconfigured IP address will initiate a process for resolving an IP address. That process is described with reference to FIG. 3 and in practice is mainly performed by software within the proxy 3.

When the proxy has resolved an IP address for the device it sends a declaratory message, identified herein as 'YOU_ARE' the message including the allocated IP address and preferably a subnet mask and other IP configuration parameters. Upon receipt of the 'YOU_ARE' message frame the device will configure itself with the supplied parameters and respond with a 'I_AM_HERE' message frame, the IP address field being set to the new IP address allocated to that device. If the allocation mechanism were through DHCP, the device will use that IP address for as long as its lease time allows. It will revert to 0.0.0.0 when the 'lease' expires. Periodically, the proxy may update (or validate) the least be interaction with the DHCP server to gain refreshed lease parameters. A special case of the lease is 'infinite' where the IP address is used for as long as the device is operational.

As will be apparent, an advantage of such a scheme is that the functionality associated with operating an IP address allocation scheme such as DHCP can be migrated from the device to a proxy. In practice, this means that the device need only (for the purpose of address allocation) contain 'embedded' software sufficient to respond to the messages described previously. This requires minimal storage space in the device. New IP schemes require only an upgrade to an application which runs on the PC and will not normally require an upgrade of the devices. Furthermore, the scheme will operate over networks. It can be used to hide the MAC address from the user. The MAC address is used by the proxy to uniquely identify a device so that the device is not confused with other devices. If an IP address needs (as described later) to be entered by the user, the user is prompted to supply merely an IP address, there is no need to specify the MAC address because this is handled internally by the proxy.

FIG. 3 illustrates a scheme by which the IP address may be allocated to an unconfigured device newly discovered on the network. The stages shown in FIG. 3 are all performed by the proxy device 3 on behalf of the 'new' device 4.

Stage 31 indicates the discovery of a new unconfigured device. This corresponds to the receipt of the 'I_AM_HERE' message with the dummy IP address as described with reference to FIG. 2. The proxy 3 now sends a DHCP request on behalf of the device 4. If there is a DHCP server on the network, the proxy 3 will receive a DHCP response with an IP address for the device. The proxy can then send out a YOU_ARE frame configuring the device 4 with this IP address—stage 34. If the proxy does not receive a response to the DHCP request then it will timeout and move on to stage 35. If there is a time-out, there is a determination whether proxy's address is in the automatic private IP range. For the proxy to allocate IP addresses to devices using Automatic Private IP addressing, its own address must also be in this range. If its address is not in this range and the device is allocated an IP address from the auto IP range then the proxy will not be able to communicate with the device using IP as they will be in separate subnets. If it is in that range, an IP address may be automatically allocated, stage 36, the address may be tested for conflict with any existing addresses (stage 37). This may be done by means of an address resolution protocol (ARP) or an ICMP echo request. If there is a conflict, i.e. with an existing occupied address (stage 38) this sub process (stages 36–38) is repeated. Every time stage 36 is entered a new address is generated from the auto IP range for testing in stage 37. This cycle will continue until a free address is found. These three stages are all defined by an automatic private IP addressing scheme. If the proxy's address is not in an automatic private IP range, the user is prompted to provide an IP address, stage 39. On entry of the address the proxy checks whether the address is on the same subnet (stage 40). If necessary the manually entered IP address is conveyed to the device, stage 34.

What is claimed is:

1. A method of allocating an internet protocol address to a device connected to a packet-based communication network, comprising:

placing on the network an interrogation in the form of a first control frame from a proxy, said proxy being separate from said device;

receiving at the proxy a response from said device in the form of a second control frame which defines an invalid internet protocol address for said device;

in response to said invalid internet protocol address, sending from the proxy to a separate server a request for an internet protocol address for said device;

in response to the reception of said second control frame by said proxy, operating said proxy to test potential internet protocol addresses for conflict with existing internet protocol addresses, and obtaining said valid internet protocol address when conflict thereof with existing internet protocol addresses is absent by at least one of steps (a) to (c) as follows:

(a) by means of said request addressed according to a dynamic host communication protocol;

(b) automatic private internet protocol addressing; and (c) manual entry of the internet protocol address, wherein said steps (a) to (c) are performed in the order (a),(b) and (c) until said valid internet protocol obtained; and sending from the proxy to said device a third control frame which includes a valid internet protocol address allocated to said device.

* * * * *